United States Patent
Brill et al.

(10) Patent No.: US 11,492,229 B2
(45) Date of Patent: Nov. 8, 2022

(54) METHOD, APPARATUS AND SYSTEM FOR THE ELECTRIFICATION OF A FIELD CHOPPER

(71) Applicant: Deere & Company, Moline, IL (US)

(72) Inventors: Christian Brill, Zweibrücken (DE); Nicolai Tarasinski, Frankenthal (DE); Volker Kegel, Mannheim (DE); Philipp Lehmann, Homburg (DE)

(73) Assignee: DEERE & COMPANY, Moline, IL (US)

( * ) Notice: Subject to any disclaimer, the term of this patent is extended or adjusted under 35 U.S.C. 154(b) by 515 days.

(21) Appl. No.: 16/516,669

(22) Filed: Jul. 19, 2019

(65) Prior Publication Data

US 2020/0024102 A1  Jan. 23, 2020

(30) Foreign Application Priority Data

Jul. 20, 2018 (DE) ..................... 10 2018 212 150.8

(51) Int. Cl.
  B65H 75/42 (2006.01)
  A01B 76/00 (2006.01)
  (Continued)

(52) U.S. Cl.
  CPC .......... B65H 75/425 (2013.01); A01B 76/00 (2013.01); A01D 87/0007 (2013.01);
  (Continued)

(58) Field of Classification Search
  CPC .... A01D 87/0007; A01D 90/02; A01D 41/02; A01D 43/073; B65H 54/2854;
  (Continued)

(56) References Cited

U.S. PATENT DOCUMENTS

| | | | |
|---|---|---|---|
| 2005/0284119 A1* | 12/2005 | Brunnert | A01D 41/127 56/6 |
| 2012/0097783 A1* | 4/2012 | Pack | F41H 7/005 242/416 |
| 2012/0186213 A1* | 7/2012 | Orlando | A01B 69/008 56/13.5 |

FOREIGN PATENT DOCUMENTS

| | | |
|---|---|---|
| CN | 105746076 A | 7/2016 |
| CN | 105723918 B | 6/2017 |

(Continued)

OTHER PUBLICATIONS

European Search Repod issued in counterpart European Patent Application No. 19185922.2 dated Dec. 17, 2019 (5 pages).

*Primary Examiner* — Zachary L Kuhfuss
(74) *Attorney, Agent, or Firm* — Hanley, Flight & Zimmerman, LLC (57) ABSTRACT

A method for electrification of a field chopper comprising the steps of: providing a cable drum and a winding drive on the field chopper, the cable drum and winding drive allowing at least one of the winding and unwinding of an energy supply line about the cable drum; providing a cable arm on the field chopper, the cable arm configured to adjust in at least one of an orientation and extension length to provide guided winding or unwinding of the energy supply line along a field surface; providing a pivotable ejection chute on the field chopper, the ejection chute extending beyond the cable arm and configured to transfer a chopped harvested material onto a transport vehicle driving alongside the field chopper; unwinding the energy supply line while along a first processing strip from the cable drum using the winding drive and cable arm; and winding the energy supply while along a second processing strip about the cable drum using the winding drive and the cable.

14 Claims, 4 Drawing Sheets

(51) Int. Cl.
    *A01D 87/00*    (2006.01)
    *A01D 90/02*    (2006.01)
    *B60L 9/00*     (2019.01)

(52) U.S. Cl.
    CPC ............... *A01D 90/02* (2013.01); *B60L 9/00* (2013.01); *B65H 2701/34* (2013.01)

(58) Field of Classification Search
    CPC ..... B65H 75/425; B65H 2701/34; B60L 9/00; H02G 3/03; H02G 11/003; H04B 3/02; A01B 76/00
    See application file for complete search history.

(56) References Cited

FOREIGN PATENT DOCUMENTS

| | | | | |
|---|---|---|---|---|
| DE | 102014201203 A1 * | 7/2015 | ........... | A01C 21/007 |
| DE | 102017201544 A1 | 8/2018 | | |
| DE | 102017215822 A1 | 3/2019 | | |
| EP | 3001522 A1 | 3/2016 | | |
| FR | 2857515 A1 * | 1/2005 | ............... | A01B 3/74 |
| WO | 2016063883 A1 | 4/2016 | | |

* cited by examiner

METHOD, APPARATUS AND SYSTEM FOR THE ELECTRIFICATION OF A FIELD CHOPPER

RELATED APPLICATIONS

This document claims priority based on German Patent Application No. 102018212150.8 filed on Jul. 20, 2018, which is hereby incorporated by reference into this application.

TECHNICAL FIELD

The invention relates to a method, apparatus and system for the electrification of a field chopper.

BACKGROUND

The emerging electrification in agricultural technology offers the possibility of achieving higher drive powers at the same time as lower installation space in comparison with conventional drives that are based on the use of diesel motors. This is particularly attractive for high-power operating processes, as are in particular typical for the operation of a field chopper. Depending on the potential throughput of the field chopper, the power requirement can be up to a few megawatts. One possibility for the electrical supply of such a field chopper with adequate power consists in cable-bound operation.

SUMMARY

Various aspects of examples of the present disclosure are set forth in the claims. A method for electrification of a field chopper comprising the steps of: providing a cable drum and a winding drive on the field chopper, the cable drum and winding drive allowing at least one of the winding and unwinding of an energy supply line about the cable drum; providing a cable arm on the field chopper, the cable arm configured to adjust in at least one of an orientation and extension length to provide guided winding or unwinding of the energy supply line along a field surface; providing a pivotable ejection chute on the field chopper, the ejection chute extending beyond the cable arm and configured to transfer a chopped harvested material onto a transport vehicle driving alongside the field chopper; unwinding the energy supply line while along a first processing strip from the cable drum using the winding drive and cable arm; and winding the energy supply while along a second processing strip about the cable drum using the winding drive and the cable.

An electrified field chopper, the field chopper comprising: a cable drum and a winding drive, the cable drum and winding drive allowing at least one of the winding and unwinding of an energy supply line about the cable drum; a cable arm, the cable arm configured to adjust in at least one of an orientation and extension length to provide guided winding or unwinding of the energy supply line along a field surface; a pivotable ejection chute on the field chopper, the ejection chute extending beyond the cable arm and configured to transfer a chopped harvested material onto a transport vehicle driving alongside the field chopper; and a control unit, the control unit configured to receive at least one of GPS data and topography data to control the unwinding of the energy supply line along a first processing strip and winding of the energy supply line along a second processing strip.

A field chopper electrification system, the system comprising: a field chopper; an energy supply line laying system, the energy supply line laying system having an energy supply line, a cable drum, a winding drive, and a cable arm allowing for at least one of winding of the energy supply line about the cable drum and unwinding of the energy supply line from the field chopper along a field surface of a field; a control unit, the control unit configured to receive at least one of GPS data and topography data to control the operation of at least one of the field chopper and the energy supply line laying system; and a power supply, the power supply releasably connected to an end of the energy supply line and located in an edge region of the field to be processed, the power supply feeding electrical energy to the field chopper using the energy supply line.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

It is the object of the present invention to provide a method and apparatus of the type mentioned above that permits electrification and reliable operation of a cable-bound field chopper. In the method for the energy supply of a cable-bound field chopper, the field chopper comprises a cable drum to accommodate an energy supply line, a winding drive connected to the cable drum for winding up and unwinding the energy supply line, a cable arm in the rear end of the field chopper, whose orientation and/or extension length can be adjusted by an actuation arrangement, said arm being used for the guided laying down or taking up of the energy supply line along a field surface that is to be traveled, and an ejection chute that can be pivoted over and beyond the cable arm for transferring the load of chopped harvested material onto a transport vehicle driving alongside.

According to the invention, the winding drive is driven in connection with the actuation arrangement of the cable arm by a control unit along a first processing section in such a way that the energy supply line is laid down on the field surface in a harvested region between the field chopper and a region to the side of the track of the field chopper that is still to be harvested, and, after driving through a headland, is picked up again from the field surface in the harvested region along a second processing section that is adjacent to the first processing section or that overlaps it.

In other words, the energy supply line is laid down along the first processing section on a defined cable path, in particular, one positioned by GPS, and is picked up again from there during harvesting of the adjacent row of plants along the second processing section, without resulting in crossing over the track of the field chopper or of the transport vehicle. The transport vehicle is always located on the side of the field chopper that faces the harvested region. When driving through the headland, that is when turning, the ejection chute is accordingly pivoted over and beyond the cable arm onto the opposite side of the field chopper. The energy supply line is laid down in such a way that an adequate clearance from the transport vehicle can always be maintained along the second processing section when transferring the load of the chopped harvested material. During the overall harvesting process, the two processing sections are passed through periodically one after the other, until the complete field surface has been harvested in strips.

The winding drive is preferably controlled in connection with the actuation arrangement of the cable arm by the control unit when driving through the headland between the first and second processing section in such a way that the energy supply line is guided with essentially no tensile force when transferring from the first to the second processing section. The energy supply line is, by definition, essentially free of tensile force when it largely retains its position between the two processing sections during the turning process at the headland, and the next row of plants to be harvested is therefore not damaged by unwanted changes in position.

In order to avoid a mechanical overload of the energy supply line, it is possible that the energy supply line is laid down on the field surface in a manner that depends on the transit speed, in particular while maintaining a specified maximum tensile force. The current tensile force can be estimated by the control unit, with reference in particular to the exit angle of the energy supply line in the region of a guide element at the cable arm. Reference is made in this respect to the sensor arrangement known from German Patent Application No. 10 2017 201 544 A1.

The energy supply line is typically fed with electrical energy by a transformer station. This is located in the edge region of the field to be processed, and in particular is connected to an overhead cable. The transformer station generally comprises a voltage conversion transformer to provide a medium voltage in the range of 4000 to 8000 volts, so that the transmission of sufficient electrical power is ensured concurrently with acceptable cable diameters. The energy supply line is releasably connected to the transformer station by a power connector.

It is also conceivable that a clearance signal is transmitted via the energy supply line that is provided for a contact-free derivation of a safety clearance to be maintained with respect to the energy supply line. An excessively close approach of the transport vehicle to the energy supply line can, for example, be recognized in this way, and avoided through the initiation of appropriate countermeasures. These can, for example, take place in the form of a corrective steering action or emergency stop carried out by a vehicle controller of the transport vehicle as well as of the field chopper, if appropriate.

Figure 1:
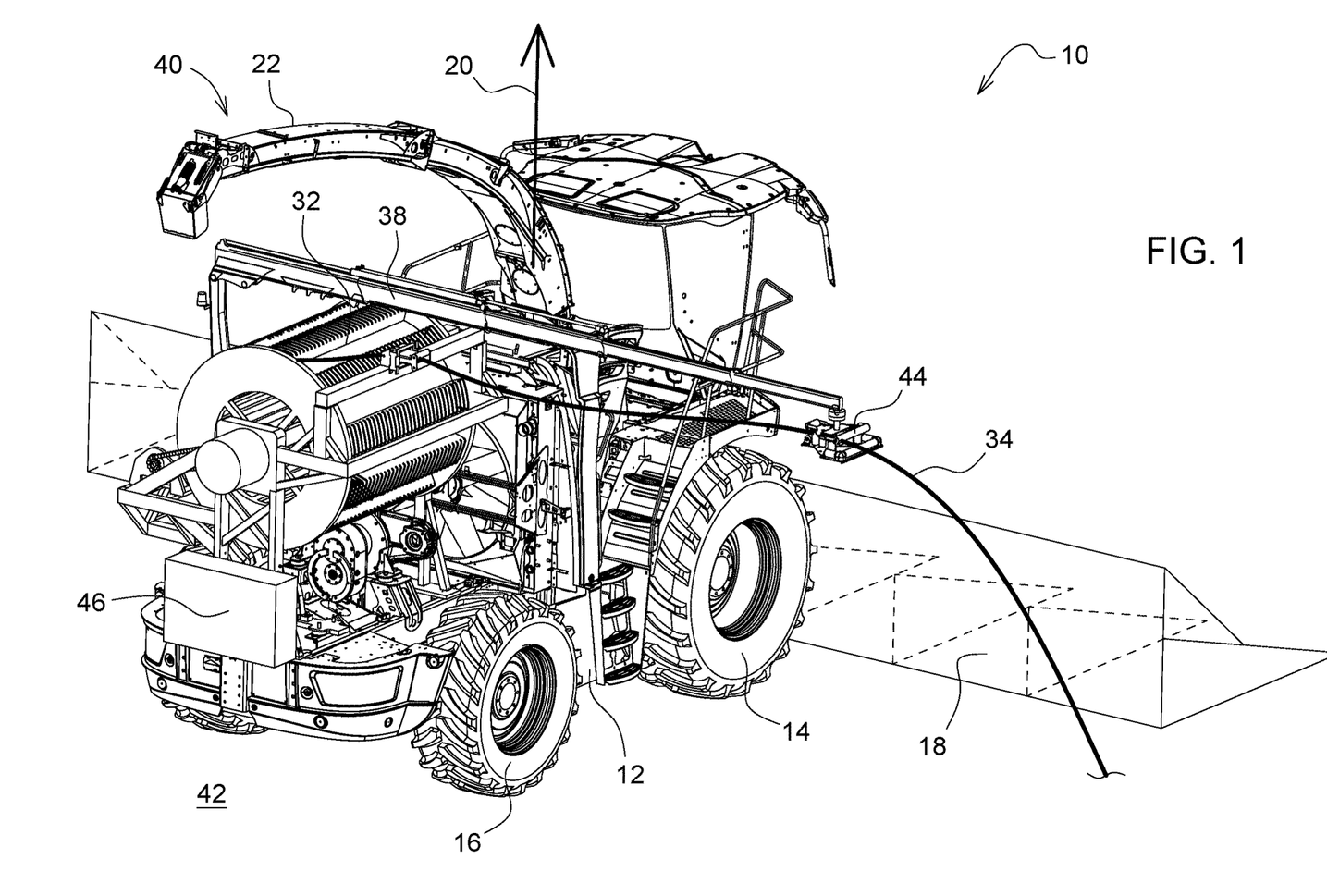
FIG. 1 shows a perspective view of a cable-bound field chopper.

The field chopper 10 comprises a chassis 12 that is carried by driven front wheels 14 and steerable rear wheels 16. A harvesting header 18 serves to pick up harvested material that is to be chopped, wherein this is chopped inside the field chopper 10 and fed to an ejection chute 22 that is adjustable with respect to an approximately vertical vehicle axis 20 and in its inclination, for transferring the load to a transport vehicle driving alongside. The latter has the form of a vehicle combination 28 consisting of an agricultural tractor 24 and a wagon 26 for transferring the load towed by said tractor (see FIGS. 3 and 4). The harvested material is, for example, maize, grass, or alfalfa.

Figure 2:
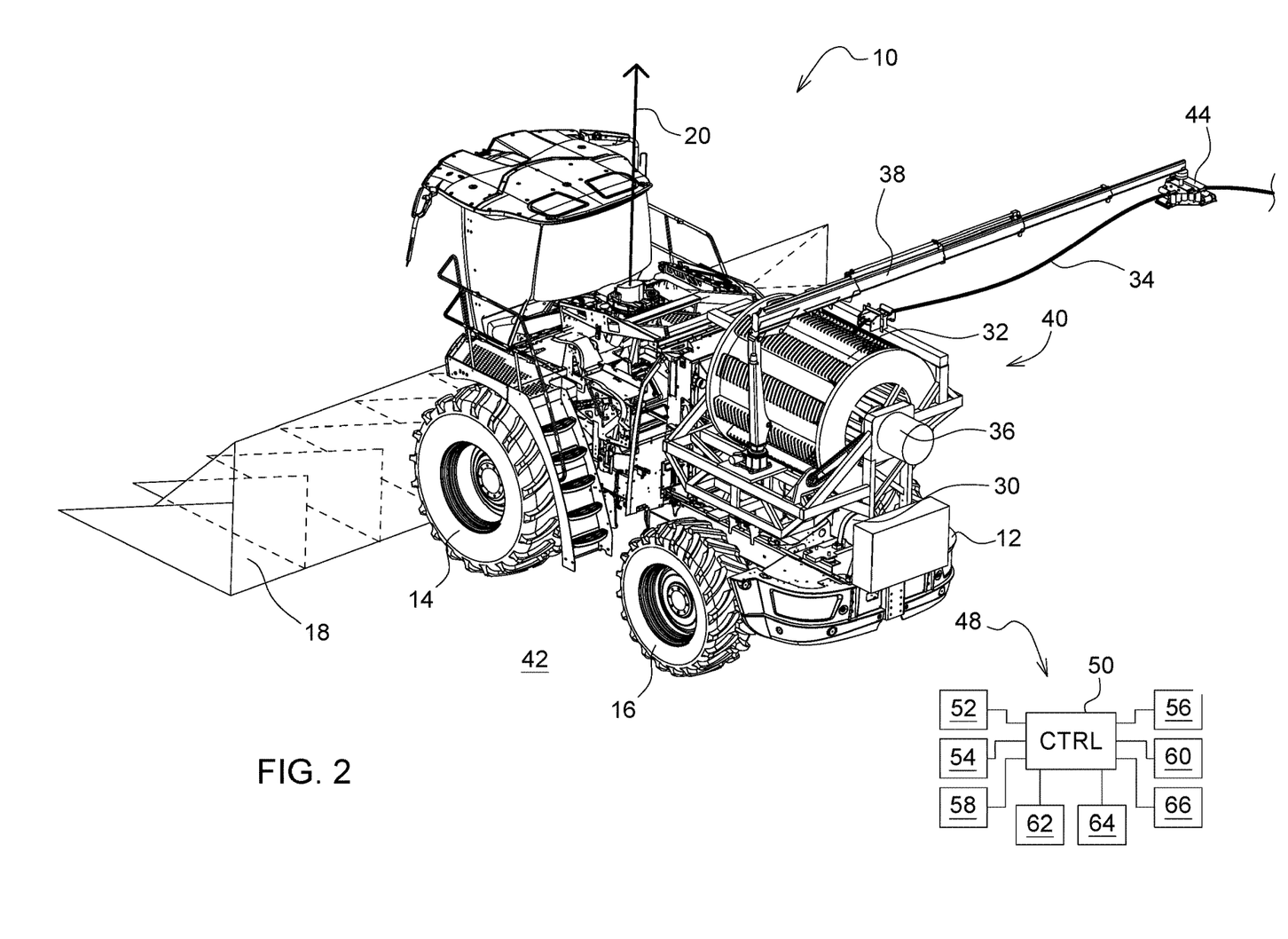
FIG. 2 shows an exemplary embodiment of an arrangement for carrying out the method according to the invention for the cable-bound field chopper in FIG. 1.

In accordance with the representation in FIG. 2, the field chopper 10 is fitted in the present case with an electric drive unit 30 for driving the front wheels 14 and for feeding and processing the harvested material to be chopped, wherein the drive unit 30 is supplied with electrical current by an energy supply line 34 positioned on a cable drum 32 in the form of a multipolar electrical cable. A winding drive 36 connected to the cable drum 32 enables a controlled winding up and unwinding of the energy supply line 34, wherein a cable arm 38 in the rear end 40 of the field chopper 10, whose orientation and/or extension length can be adjusted, said arm being used for the guided laying down or taking up of the energy supply line 34 along a field surface 42 that is to be traveled and which comprises a guide element 44 for this purpose. The cable drum 32 is an air-cooled implementation, as is known from German Patent Application No. 10 2017 215 822 A1.

An arrangement 48, reproduced in detail in FIG. 2, comprising a microprocessor-controlled control unit 50 that serves to carry out the method according to the invention is housed in a switch cabinet 46 arranged in the rear end 40 of the field chopper 10.

The control unit 50 is connected to a GPS navigation system 52, a topography memory 54, an autonomous steering system 56, a mobile radio interface 58, an electric geared motor 60 of the winding drive 36, an actuation arrangement 62 for positioning the cable arm 38, a further actuation arrangement 64 for positioning the ejection chute 22, and a transponder unit 66.

The method according to the invention carried out by the control unit 50 is to be described in detail below with reference to the processing situations illustrated in FIGS. 3-4. At the beginning of the harvesting process, the energy supply line 34 is connected releasably by a power connector 68 attached thereto to a transformer station 74 located in an edge region 70 of the field 72 to be processed, in order to feed the energy supply line 34 with electrical energy. The transformer station 74 is connected to an overhead line 76 and comprises a voltage conversion transformer (not shown) to provide a medium voltage in the range of 4000 to 8000 volts. The field chopper 10 is in this case initially located in a starting position not represented in FIG. 3 or FIG. 4, to the side of the field 72 that is to be processed.

Figure 3:
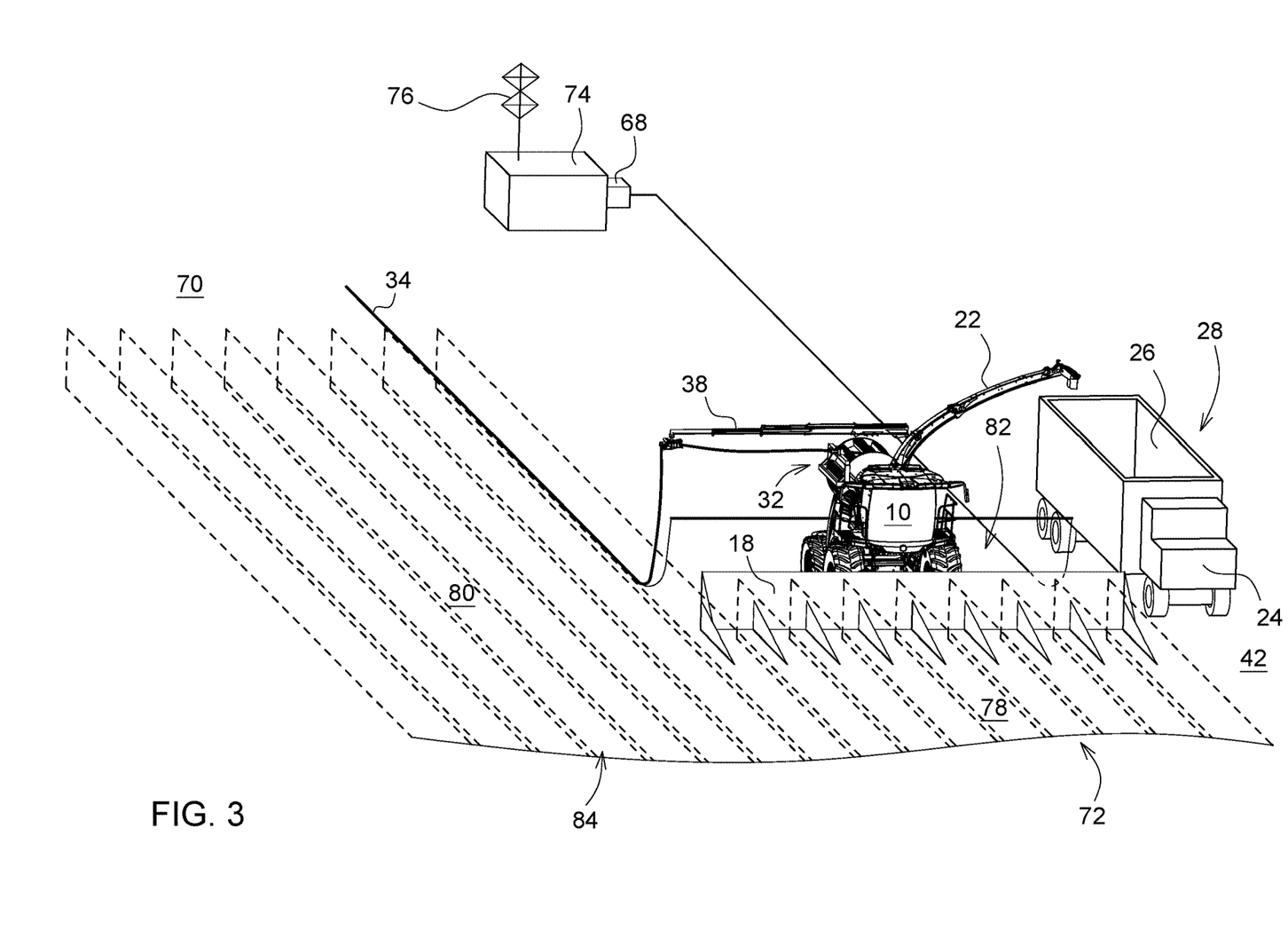
FIG. 3 shows the field chopper represented in FIG. 1 when driving through a first processing section on a field.
Figure 4:
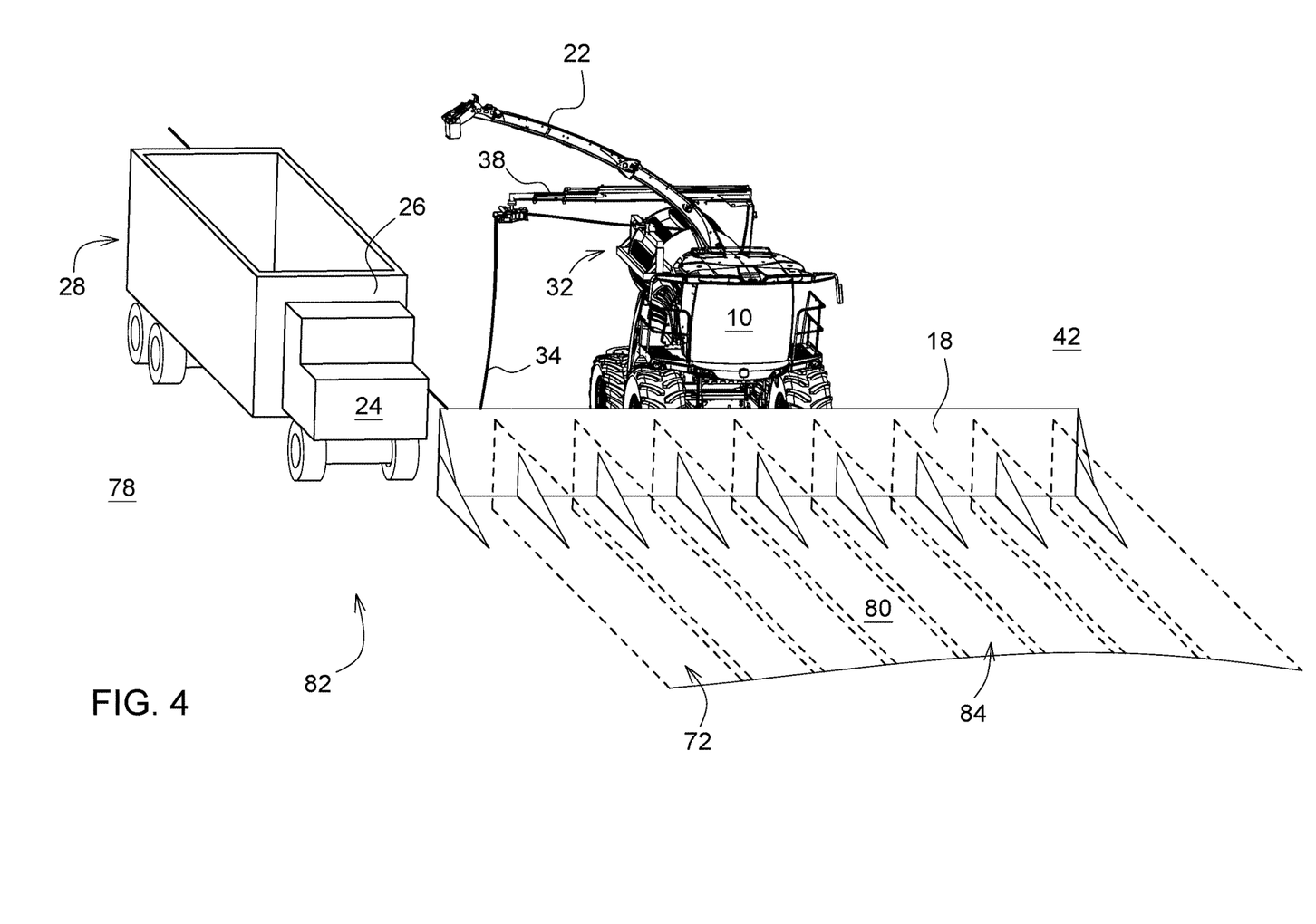
FIG. 4 shows the field chopper represented in FIG. 1 when driving through a second processing section following the first processing section.

The full harvesting process is divided into a first processing section or cycle 78 illustrated in FIG. 3, and a second processing section or cycle 80 illustrated in FIG. 4. The processing sections 78, 80 are worked through automatically by the autonomous steering system 56 based on the data made available by the GPS navigation system 52 and by the topography memory 54.

In order to carry out the actual harvesting process, the field chopper 10 is driven from its starting position to the field 72. The energy supply line 34 is laid down here along the head end of the field 72 up to the starting point of the first processing section 78. The field chopper 10 then starts to work through the first processing section 78.

First Processing Section

The electric drive motor 60 of the winding drive 36 is driven in connection with the actuation arrangement 62 of the cable arm 38 by the control unit 50 along the first processing section 78 in such a way that the energy supply line 34 is laid down on the field surface 42 in a harvested region 82 behind the harvesting header 18 between the field chopper 10 and a region 84 to the side of the track of the field chopper 10 that is still to be harvested (see FIG. 3).

Second Processing Section

After reaching the head end of the field 72 and driving through a headland, not shown, the electric drive motor 60 of the winding drive 36 is controlled in connection with the actuation arrangement 62 of the cable arm 38 by the control unit 50 along the second processing section 80 that is adjacent to the first processing section 78 or that overlaps it, in such a way that the energy supply line 34 is picked up again in the harvested region 82 (see FIG. 4).

At the end of the second processing section 80, the field chopper travels again to the next first processing section 78. The energy supply line 34 is laid down here further along the head end of the field 72 up to the starting point of the next first processing section 78, and the harvesting process is started again.

This process is repeated until the complete field surface 42 has been harvested in strips. The field chopper 10 then returns to its original starting position while picking up the energy supply line 34 at the head end of the field 72, so that after releasing the power connector 68 and stowing the energy supply line 34 it can be brought to the next working site.

Put more precisely, the energy supply line 34 is laid down by the control unit 50, on the basis of the data made available by the GPS navigation system 52 and the topography memory 54, along the first processing section 78 on a defined, that is to say GPS-positioned, cable path, and is picked up again from there, while harvesting the next row of plants along the second processing section 80, without resulting in crossing over the track of the field chopper 10 or of the vehicle combination 28. The energy supply line 34 is laid down in such a way that an adequate clearance from the vehicle combination 28 can be maintained along the second processing section 80 when transferring the load of chopped harvested material.

The vehicle combination 28 is always located on the side of the field chopper 10 that faces the harvested region 82. When driving through the headland, that is when turning, the ejection chute 22 is pivoted by the control unit 50 by control of the further actuation arrangement 64 over and beyond the cable arm 38 onto the opposite side of the field chopper 10.

In addition, the electric geared motor 60 of the winding drive 36, in connection with the actuation arrangement 62, is controlled by the control unit 50 when driving through the headland in such a way that the energy supply line 34 is guided with minimal or essentially no tensile force when transferring from the first processing section 78 to the second processing section 80. The energy supply line 34 is, by definition, essentially free of tensile force when it largely retains its position between the two processing sections 78, 80 during the turning process at the headland, so that the next row of plants to be harvested is not damaged by unwanted changes in position.

In order to avoid a mechanical overload of the energy supply line 34, it is laid down by the control unit 50 on the field surface 42 in a manner that depends on the transit speed, and specifically while maintaining a specified maximum tensile force. The current tensile force is estimated by the control unit 50 with reference to the exit angle of the energy supply line 34 in the region of the guide element 44 at the cable arm 38 by a sensor arrangement, not shown. The current travel speed is, for example, yielded by evaluating the data made available by the GPS navigation system 52.

Optionally, a clearance signal, fed in or modulated on by the transponder unit 66, is transmitted from the energy supply line 34 by the control unit 50, said signal being provided for a contact-free derivation of a safety clearance to be maintained with respect to the energy supply line 34. In this case, the vehicle combination 28 is fitted with a corresponding receiver unit in order to estimate whether the safety clearance has been fallen short of on the basis of the received clearance signal. An excessively close approach of the vehicle combination 28 to the energy supply line 34 can be recognized in this way and avoided through the initiation of appropriate countermeasures. These take place in the form of a corrective steering action or emergency stop of the vehicle combination 28 carried out by a vehicle controller as well as, if appropriate, of the field chopper 10, wherein in the latter case an appropriate exchange of information takes place via the mobile radio interface 58.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of a skilled artisan in light of this disclosure. In addition, those skilled in the art will appreciate that the mechanisms of the subject matter described herein are capable of being distributed as a program product in a variety of forms, and that an illustrative embodiment of the subject matter described herein applies regardless of the type of signal bearing medium used to carry out the distribution. Examples of a signal bearing medium include, but are not limited to, the following: an edge computing module or device; a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a computer system or computing element (or portion thereof) such as, but not limited to, one or more or some combination of: a visual organizer system, a request generator, an Internet coupled computing device, a computer server, etc. In one example, the computer system and/or the computing element may manipulate and transform information and/or data represented as physical (electronic) quantities within the computer system's and/or computing element's processor(s), register(s), and/or memory(ies) into other data similarly represented as physical quantities within the computer system's and/or computing element's memory(ies), register(s) and/or other such information storage, processing, transmission, and/or display components of the computer system(s), computing element(s) and/or other electronic computing device(s). Under the direction of computer-readable instructions, the computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The invention claimed is:
1. A method for electrification of a field chopper, the method comprising:
providing a cable drum and a winding drive on the field chopper, the cable drum and the winding drive allowing at least one of winding or unwinding of an energy supply line about the cable drum;
providing a cable arm on the field chopper, the cable arm adjustable in at least one of orientation or extension length to provide guided winding or unwinding of the energy supply line along a field surface;
providing a pivotable ejection chute on the field chopper, the pivotable ejection chute extending beyond the cable arm and configured to transfer a chopped harvested material onto a transport vehicle driving alongside the field chopper, wherein a clearance signal is transmitted via the energy supply line to provide a contact-free derivation of a safety clearance to be maintained with respect to the energy supply line;
unwinding the energy supply line from the cable drum using the winding drive and the cable arm while along a first processing section; and winding the energy supply line about the cable drum using the winding drive and the cable arm while along a second processing section.

2. The method of claim 1, wherein the energy supply line is connected at one end to the field chopper and, at the other end, removably connected to a power supply.

3. The method of claim 2, wherein the power supply feeding the energy supply line is electrical energy from a transformer station.

4. The method of claim 1, further including controlling, with a control unit, at least one of the winding or the unwinding of the energy supply line.

5. The method of claim 4, wherein the control unit unwinds the energy supply line in a defined path along the first processing section using at least one of GPS data or topography data.

6. The method of claim 5, wherein the winding of the energy supply line occurs while harvesting a next row of plants along the second processing section, the winding of the energy supply line occurring without crossing over a track of the field chopper or of a vehicle combination.

7. The method of claim 4, wherein the winding drive is controlled in connection with an actuation arrangement of the cable arm by the control unit when driving through a headland between the first and second processing sections such that the energy supply line is guided with minimal tensile force when transferring from the first processing section to the second processing section.

8. The method of claim 7, wherein the pivotable ejection chute is pivoted over and beyond the cable arm onto an opposite side of the field chopper when turning in the headland.

9. The method of claim 4, wherein the winding and the unwinding of the energy supply line on the field surface is based on at least one of a transit speed of the field chopper or a specified maximum tensile force.

10. The method of claim 4, wherein the unwinding of the energy supply line along the first processing section occurs in a harvested region between the field chopper and a region to a side of a track of the field chopper that is still to be harvested.

11. The method of claim 4, wherein the winding of the energy supply line along the second processing section occurs after driving through a headland and in a harvested region that is adjacent or overlapping to the first processing section.

12. A method for electrification of a field chopper, the method comprising:
providing a cable drum and a winding drive on the field chopper, the cable drum and the winding drive allowing at least one of winding or unwinding of an energy supply line about the cable drum;
providing a cable arm on the field chopper, the cable arm adjustable in at least one of orientation or extension length to guide the at least one of the winding or the unwinding of the energy supply line along a field surface;
providing a pivotable ejection chute on the field chopper, the pivotable ejection chute extending beyond the cable arm and configured to transfer a chopped harvested material onto a transport vehicle driving alongside the field chopper, wherein a clearance signal is transmitted via the energy supply line to provide for a contact-free derivation of a safety clearance to be maintained with respect to the energy supply line;
unwinding the energy supply line from the cable drum using the winding drive and the cable arm while along a first processing section;
winding the energy supply line about the cable drum using the winding drive and the cable arm while along a second processing section;
controlling, with a control unit, at least one of the winding or the unwinding of the energy supply line; and
estimating, with the control unit, a current tensile force on the energy supply line using at least an exit angle of the energy supply line at the cable arm.

13. An electrified field chopper, comprising:
a cable drum and a winding drive, the cable drum and the winding drive allowing at least one of winding or unwinding of an energy supply line about the cable drum;
a cable arm, the cable arm adjustable in at least one of orientation or extension length to guide the at least one of the winding or the unwinding of the energy supply line along a field surface;
a pivotable ejection chute on the electrified field chopper, the pivotable ejection chute extending beyond the cable arm and configured to transfer a chopped harvested material onto a transport vehicle driving alongside the electrified field chopper; and
a control unit, the control unit configured to receive at least one of GPS data or topography data to control the unwinding of the energy supply line along a first processing strip and the winding of the energy supply line along a second processing strip, wherein a clearance signal is transmitted via the energy supply line to provide a contact-free derivation of a safety clearance to be maintained with respect to the energy supply line.

14. A field chopper electrification system, comprising:
a field chopper;
an energy supply line laying system including (a) an energy supply line, (b) a cable drum, (c) a winding drive, and (d) a cable arm allowing at least one of winding of the energy supply line about the cable drum or unwinding of the energy supply line from the field chopper along a field surface of a field;
a control unit, the control unit configured to receive at least one of GPS data or topography data to control operation of at least one of the field chopper or the energy supply line laying system, wherein a clearance signal is transmitted via the energy supply line to provide a contact-free derivation of a safety clearance to be maintained with respect to the energy supply line; and
a power supply, the power supply releasably connected to an end of the energy supply line and located in an edge region of the field to be processed, the power supply to provide electrical energy to the field chopper using the energy supply line.

* * * * *